United States Patent
Pfadler et al.

(10) Patent No.: US 11,518,379 B2
(45) Date of Patent: Dec. 6, 2022

(54) TRANSPORTATION VEHICLE AND COLLISION AVOIDANCE METHOD

(71) Applicant: VOLKSWAGEN AKTIENGESELLSCHAFT, Wolfsburg (DE)

(72) Inventors: Andreas Pfadler, Berlin (DE); Bernd Lehmann, Wolfsburg (DE)

(73) Assignee: Volkswagen Aktiengesellschaft

( * ) Notice: Subject to any disclaimer, the term of this patent is extended or adjusted under 35 U.S.C. 154(b) by 112 days.

(21) Appl. No.: 16/845,618

(22) Filed: Apr. 10, 2020

(65) Prior Publication Data
US 2020/0324762 A1    Oct. 15, 2020

(30) Foreign Application Priority Data
Apr. 12, 2019   (DE) ...................... 10 2019 205 365.3

(51) Int. Cl.
  *B60W 30/095*   (2012.01)
  *B60W 30/09*    (2012.01)
  *B60W 50/14*    (2020.01)

(52) U.S. Cl.
  CPC .......... *B60W 30/095* (2013.01); *B60W 30/09* (2013.01); *B60W 50/14* (2013.01);
  (Continued)

(58) Field of Classification Search
  CPC .... B60W 30/095; B60W 30/09; B60W 50/14; B60W 2530/201; B60W 2556/40;
  (Continued)

(56) References Cited

U.S. PATENT DOCUMENTS 7,215,254 B2   5/2007   Tauchi
9,442,489 B2   9/2016   Reichel et al.
(Continued)

FOREIGN PATENT DOCUMENTS

DE         10125966 A1    5/2002
DE      102005017811 A1   11/2005
(Continued)

OTHER PUBLICATIONS

T. Erkert, "Computer Simulation of Offtracking of Truck and Trailer COmbinations Using Forest Roads", M.S. thesis Oregon State University (Year: 1989).*

(Continued)

*Primary Examiner* — Peter D Nolan
*Assistant Examiner* — Tanya C Sienko
(74) *Attorney, Agent, or Firm* — Barnes & Thornburg, LLP

(57) ABSTRACT

A transportation vehicle with at least one first sensor for capturing environment data, at least one second sensor for capturing transportation vehicle data, a communication module for establishing a data connection with another transportation vehicle, a driving system for automated driving of the transportation vehicle, at least one output element for a visible/audible warning signal, and a control unit. The control unit determines a predicted trajectory of the transportation vehicle, determines a predicted path of the transportation vehicle and receives a predicted trajectory and vehicle geometry data of the other transportation vehicle via the data connection, determines a predicted path of the other transportation vehicle, determines a possible collision of the transportation vehicle with the other transportation vehicle, and in response to a possible collision, outputs a warning signal by the at least one output element and/or carries out an automated driving maneuver by the driving system.

16 Claims, 1 Drawing Sheet

(52) U.S. Cl.
CPC . *B60W 2050/143* (2013.01); *B60W 2050/146* (2013.01); *B60W 2530/201* (2020.02); *B60W 2530/205* (2020.02); *B60W 2554/801* (2020.02); *B60W 2556/40* (2020.02)

(58) Field of Classification Search
CPC ..... B60W 2530/205; B60W 2554/801; B60W 2050/143; B60W 2050/146; B60W 2520/105; B60W 2710/18
See application file for complete search history.

(56) References Cited

U.S. PATENT DOCUMENTS

| | | | |
|---|---|---|---|
| 9,873,427 | B2 | 1/2018 | Danzl et al. |
| 11,004,000 | B1 * | 5/2021 | Gutmann .......... B60W 30/0956 |
| 2008/0312832 | A1 * | 12/2008 | Greene .................. G08G 1/166 701/301 |
| 2010/0052945 | A1 * | 3/2010 | Breed ...................... G01S 17/89 340/903 |
| 2012/0306663 | A1 * | 12/2012 | Mudalige ............... G08G 1/163 340/903 |
| 2015/0094945 | A1 * | 4/2015 | Cheng ................ B60K 31/0066 701/408 |
| 2016/0342850 | A1 * | 11/2016 | Elimalech ................. B60R 1/00 |
| 2017/0316684 | A1 * | 11/2017 | Jammoussi ...... G08G 1/096716 |
| 2019/0265714 | A1 * | 8/2019 | Ball ...................... G05D 1/0221 |
| 2021/0206315 | A1 * | 7/2021 | Fassbender ............ B60Q 5/006 |

FOREIGN PATENT DOCUMENTS

| | | |
|---|---|---|
| DE | 102006013817 A1 | 9/2007 |
| DE | 102007015033 A1 | 2/2008 |
| DE | 102008040077 A1 | 1/2010 |
| DE | 102011115421 A1 | 4/2013 |
| DE | 102012021282 A1 | 4/2014 |
| DE | 102014107917 A1 | 9/2015 |
| DE | 102014008897 A1 | 12/2015 |
| EP | 1921591 A1 | 5/2008 |
| EP | 2323116 A1 | 5/2011 |
| EP | 3036124 A1 | 6/2016 |
| KR | 101798053 B1 * | 11/2017 |
| WO | WO-2019012629 A1 * | 1/2019 .............. G08G 1/09 |

OTHER PUBLICATIONS

O'Grady, S. "TruckScience & Load Expert compared" https://truckscience.com/load-xpert/ (Year: 2016).*

* cited by examiner

TRANSPORTATION VEHICLE AND COLLISION AVOIDANCE METHOD

PRIORITY CLAIM

This patent application claims priority to German Patent Application No. 10 2019 205 365.3, filed 12 Apr. 2019, the disclosure of which is incorporated herein by reference in its entirety.

SUMMARY

Illustrative embodiments relate to a transportation vehicle with a control unit set up to carry out a method for the avoidance of collisions of transportation vehicles. Illustrative embodiments also relate to such a method of collision avoidance.

BRIEF DESCRIPTION OF THE DRAWINGS

Disclosed embodiments are explained below with reference to the drawings, in which.

DETAILED DESCRIPTION

Figure 1:
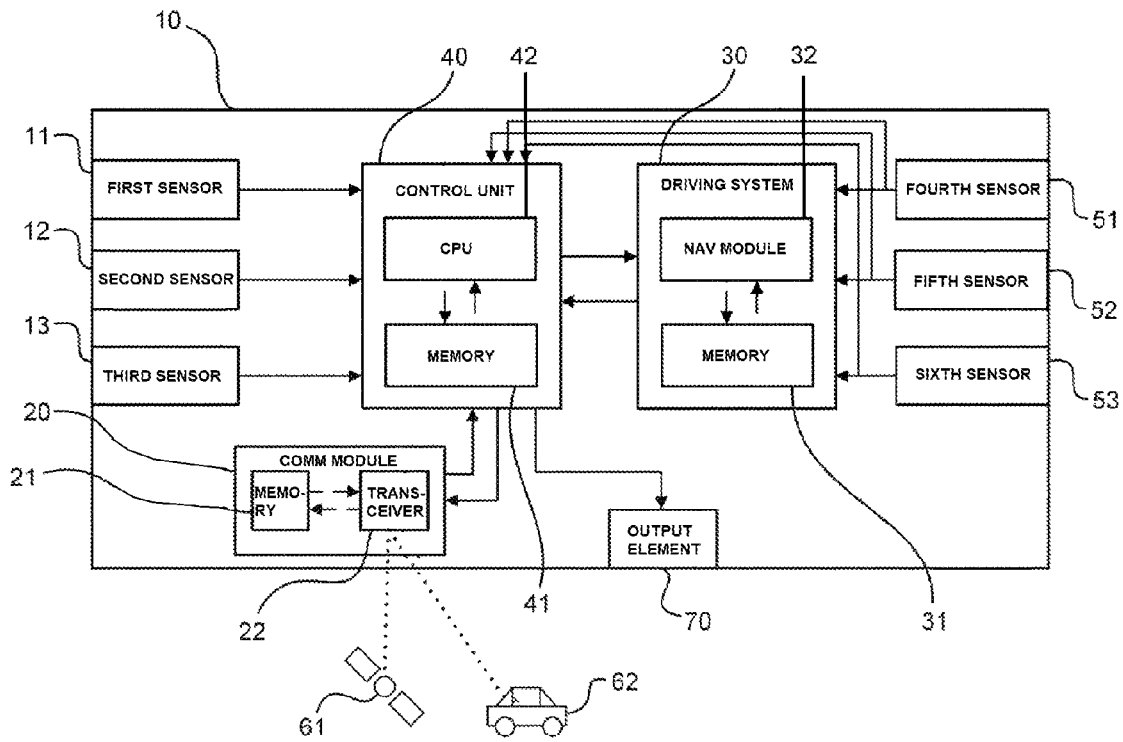
FIG. 1 shows a schematic representation of an exemplary embodiment of a disclosed transportation vehicle.

Today's transportation vehicles already have a variety of assistance systems that provide computer-based support to the driver in a variety of driving situations. Such assistance systems can use sensors to capture a variety of measurement data, which far exceed the sensory capabilities of humans. In addition, the speed of these assistance systems significantly exceeds human reaction times. Well-known driver assistance systems include lane-keeping assistants, brake assistants for pedestrian detection and distance control cruise control systems, especially for congested traffic situations, for example.

By applying such assistance systems, the autonomy of the driver with regard to his driving decisions is increasingly transferred to the transportation vehicle or control units operating in it. The culmination of these developments is an automated transportation vehicle that can maneuver completely without human intervention. However, transportation vehicles that are already partially automated offer numerous possibilities for improving driving safety and the driving experience for a driver. For example, assistance systems can be used to avoid the risk of collision between transportation vehicles. This is beneficial with regard to larger transportation vehicles, with which partial exceeding of the lane boundaries may occur when cornering, for example. Trailers which can swing out during cornering are also critical, wherein the swing-out behavior is not usually readily apparent to third party road users.

Well-known measures for indicating the enlarged swing-out area of trailers, for example, are signs, warning lights or flags, which are usually attached to the rear end of the trailer. Thus, these warnings are not visible for oncoming transportation vehicles. It is also known from DE 10 2006 013 817 B4 that a transportation vehicle with a swing-out protrusion itself detects whether there is a risk that the protrusion will swing out beyond a lane boundary. If such a risk is identified, a warning message is output to other road users.

With these and other known methods for outputting warnings of transportation vehicles swinging out, however, only the transportation vehicle potentially swinging out itself always determines whether swinging out into additional lanes is to be feared and, if appropriate, outputs a warning. This information is transmitted non-selectively to road users in the area, even if they are not affected by the swinging out. This is detrimental to the risk of false reports, which may affect the acceptance of such warning systems and lead to fewer received warning messages being taken into account.

Disclosed embodiments enrich the prior art and overcome or at least reduce the drawbacks resulting from the prior art and provide an improved method for avoiding collisions between transportation vehicles.

Disclosed embodiments provide a transportation vehicle and a method.

A first disclosed embodiment concerns a transportation vehicle, in particular, a passenger car with a combustion engine, an electric motor or a hybrid engine, which has at least a first sensor set up for the collection of environment data, at least a second sensor set up for the collection of transportation vehicle data, a communication module set up for establishing a data connection with another transportation vehicle, a driving system set up for the purpose of automated driving of the transportation vehicle and at least one output element for a visible or audible warning signal.

According to the disclosure, the at least one first sensor is designed to detect sensor signals related to the environment of the transportation vehicle. The at least one second sensor is designed to detect sensor signals related to the transportation vehicle itself. The communication module is designed to receive information via a communication network, in particular, vehicle to vehicle communication (V2V), the driving system is set up for partially or fully automated longitudinal and/or transverse guidance of the transportation vehicle and the output element may be designed as part of a digital instrument panel or an infotainment system.

The transportation vehicle also has a control unit, wherein the control unit is set up to determine a predicted trajectory of the transportation vehicle based on vehicle data and environment data and/or map data. In other words, based on captured data related to the transportation vehicle and based on captured data related to the environment of the transportation vehicle or map data, the transportation vehicle determines a prediction of its locations on a 2D surface in a future period. Optionally, the predicted trajectory also includes predicted velocity and/or acceleration values (vectors) for each of the predicted locations.

The control unit is also set up to determine a predicted path of the transportation vehicle based on the predicted trajectory of the motor transportation vehicle and the vehicle geometry data of the transportation vehicle. In a disclosed embodiment, the vehicle geometry data comprises the dimensions of the transportation vehicle, optionally a physical model of the transportation vehicle, including pivot points, axle position, protrusions, etc.

Thus, for each of the predicted locations of the transportation vehicle, the control unit determines a space requirement of the transportation vehicle along the predicted trajectory based on the dimensions of the transportation vehicle and/or a physical model of the transportation vehicle. Optionally, the space requirement is determined not only statically based on the dimensions of the transportation vehicle but also dynamically taking into account the forces acting on the transportation vehicle when driving along the predicted trajectory. The acting forces as well as the effects on the physical model of the transportation vehicle may be determined based on velocity and acceleration vectors.

The control unit is also set up to receive a predicted trajectory and vehicle geometry data of the other transportation vehicle via the data connection, in particular, via a V2V data connection. The predicted trajectory also includes the predicted locations of the other transportation vehicle in a future period of time, as well as optionally predicted velocity and/or acceleration values (vectors) for each of the predicted locations. In a disclosed embodiment, the transportation vehicle geometry data comprises the dimensions of the other transportation vehicle, optionally a physical model of the transportation vehicle, including pivot points, axle position, protrusions, etc.

The exemplary control unit of the disclosed transportation vehicle is set up to determine a predicted path of the other transportation vehicle based on this received data. Thus, for each of the predicted locations of the other transportation vehicle, the control unit determines a space requirement of the other transportation vehicle along the predicted trajectory based on the dimensions of the other transportation vehicle and/or a physical model of the other transportation vehicle. Optionally, the space requirement is determined not only statically based on the dimensions of the other transportation vehicle but also dynamically taking into account the forces acting on the other transportation vehicle when driving along the predicted trajectory. The acting forces as well as the effects on the physical model of the other transportation vehicle may be determined based on velocity and acceleration vectors.

The disclosed control unit is further set up to determine a possible collision of the transportation vehicle and the other transportation vehicle based on the predicted path of the transportation vehicle and based on the predicted path of the other transportation vehicle. In other words, the transportation vehicle determines, based on the predicted space requirements of both transportation vehicles, whether they may occupy the same spatial area at a future time. In such a case, a possible collision is determined or predicted.

The disclosed control unit is further set up to output a warning signal in the case of a possible collision by at least one output element or to perform an automated driving maneuver by the driving system. Performing an automated driving maneuver can depend on a selected driving mode and, for example, may only be carried out in an automated driving mode. Also, an automated driving maneuver is also carried out in a manual driving mode, for example, if a driver has not initiated a suitable driving maneuver to avoid the collision within a predetermined time after the output of a warning.

The disclosed transportation vehicle thus determines a possible collision with another transportation vehicle based on a self-executed prediction of its own trajectory and its own space requirement as well as based on a self-executed prediction of the space requirement of the other transportation vehicle. Thus, improved accuracy of the prediction is achieved. Moreover, the knowledge of a user that a warning message is based on a calculation of his own transportation vehicle may increase the willingness to respond suitably to the warning messages, as this cannot be understood as a request from another transportation vehicle to clear the road. Thus, the disclosed transportation vehicle can increase the acceptance for such a collision warning system.

In an exemplary embodiment of the disclosed transportation vehicle, the control unit has an internal memory with map data stored therein. When determining the predicted trajectory and/or when determining the predicted path, the control unit may access the map data, for example, to estimate the forces likely to act on the transportation vehicle when passing through a bend based on the radius of the bend. Also, the control unit retrieves the map data from a navigation system of the transportation vehicle. The navigation system usually has such data anyway and thus redundancy can be avoided. Also, the control unit also retrieves route information from the navigation system.

The control unit also provides the corresponding inputs on the hardware side for the signals of the first sensors, for the signals of the second sensors and for the signals of the communication module and possibly of the navigation system. Furthermore, the control unit is set up to process the received signals of the first sensors, the second sensors and the communication module as input variables. The control unit also provides the corresponding outputs on the hardware side for the driving system and the at least one output element and is further set up to output the corresponding control signals to the driving system and the output element.

Also, the control unit is set up to determine as transportation vehicle data an absolute position, velocity, acceleration and direction of travel of the transportation vehicle by at least one second sensor. In this case, the second sensors are set up to capture the sensor signals related to the transportation vehicle itself and include a velocity sensor, a GPS sensor, a gyroscope, an electric accelerator pedal, and the like, for example. The transportation vehicle data allow the determination of a current state of motion of the transportation vehicle, in particular, a current phase space point of the transportation vehicle in position space, wherein this phase space point comprises the coordinate of the transportation vehicle as well as velocity and acceleration vectors. Also, the transportation vehicle data have information about a user input of the driver, such as setting a flasher and/or operating the brake pedal.

The control unit is also set up to determine a current lane width and information about lane boundaries as environment data. Also, the environment data include information about the course of the road ahead. The first sensors are set up to capture information concerning the environment of the transportation vehicle and include, for example, a camera, ultrasonic or lidar distance sensors and the like. The environment data allow the determination of a spatial environment of the transportation vehicle, such as road-bounding walls or guardrails, as boundary conditions of a possible transportation vehicle movement.

Furthermore, the control unit may be set up to retrieve information about the course of the road from an internal memory as map data. The information comprises information about road segments and junctions of the road ahead and optionally additional information, such as an elevation profile or a surface quality of the road. Alternatively or additionally, the control unit is set up to retrieve information about the course of the road or a navigation route of the transportation vehicle from the internal memory or a navigation system as map data. Here a navigation route refers to route guidance from a starting point to a destination point, which is determined based on a user input and which is currently being travelled along by the transportation vehicle. Such route guidance can be used, for example, to predict turning of the transportation vehicle, i.e., departure from a currently travelled road.

In an exemplary embodiment of the disclosed transportation vehicle, the control unit is set up to determine as vehicle geometry data at least the dimensions of the transportation vehicle (width and length, possibly the exact contour and height), the number and position of the axles of the transportation vehicle and/or the distances from the corner points of the transportation vehicle to its axles. Thus, the control unit has all the information to determine possible protrusions of the transportation vehicle, which could protrude into other lanes when cornering. Optionally, these transportation vehicle geometry data are retrieved from an internal memory of the transportation vehicle or are stored as a data base of a physical model of the transportation vehicle. Also, the control unit is set up to receive similar transportation vehicle geometry data of the other transportation vehicle. Thus, the control unit has all the information to determine the possible protrusions of the other transportation vehicle, which could protrude into other lanes when cornering. These transportation vehicle geometry data of the other transportation vehicle may be received via a data connection.

In an exemplary embodiment, the disclosed transportation vehicle also has at least one trailer. According to this disclosed embodiment, the control unit is further set up to also determine as transportation vehicle geometry data the dimensions of the trailer (width and length, possibly the exact contour and height), the number and position of the axles of the trailer, the distances from the corner points of the trailer to its axles, and at least one pivot point of a trailer coupling. Thus, the control unit has all the information to determine any protrusions of the trailer, which could protrude into other lanes during cornering, or to determine the swing-out behavior of the trailer. Optionally, these transportation vehicle geometry data are retrieved from an internal memory of the transportation vehicle or trailer or are stored as a data base of a physical model of the transportation vehicle.

Also, the control unit is set up to receive similar transportation vehicle geometry data about at least one trailer of the other transportation vehicle. Thus, the control unit has all the information to determine the possible protrusions of the trailer of the other transportation vehicle, which could protrude into other lanes when cornering, or to determine the swing-out behavior of the trailer of the other transportation vehicle. These vehicle geometry data of the other transportation vehicle may be received via a data connection.

In an exemplary embodiment of the disclosed transportation vehicle, the control unit is set up to determine spatial areas occupied by the transportation vehicle and the other transportation vehicle in the future as the respective predicted paths. Based on the predicted position of the respective transportation vehicle on a two-dimensional representation of the route ahead and based on the transportation vehicle geometry data, a three-dimensional spatial area occupied by the transportation vehicle is determined for each position. Also, the spatial area is determined only as a projection of the three-dimensional spatial area occupied by the transportation vehicle onto the two-dimensional representation of the route ahead. When determining the predicted spatial area, predicted velocity and/or acceleration vectors may be included for each predicted position. According to this disclosed embodiment, a possible collision of the transportation vehicles is determined if an overlap of the predicted paths is detected. In this case, an overlap means that both transportation vehicles are predicted to occupy the same spatial area at a future time or that there is an overlap of the spatial areas projected onto the two-dimensional representation of the route.

In an exemplary embodiment of the disclosed transportation vehicle, the control unit is further set up to determine at least one swing-out area of the transportation vehicle based on the transportation vehicle geometry data and the predicted trajectory of the transportation vehicle. In particular, a swing-out area refers to an area into which a body region of the transportation vehicle protruding beyond a pivot point of the transportation vehicle (often close to an axle) is moved during cornering. Alternatively, a swing-out area here means an area into which a trailer of the transportation vehicle swings around a pivot point of the trailer coupling during cornering by the transportation vehicle. Alternatively or additionally, also optionally a determination of at least one swing-out area of the other transportation vehicle is carried out based on the transportation vehicle geometry data and the predicted trajectory of the other transportation vehicle, as described above.

In an exemplary embodiment of the disclosed transportation vehicle, the control unit is further set up to determine an alternative trajectory of the transportation vehicle in the case of a possible collision with the other transportation vehicle. The alternative trajectory of the transportation vehicle, in combination with the vehicle geometry data of the transportation vehicle, leads to an alternative predicted path of the transportation vehicle. This alternative predicted path of the transportation vehicle does not overlap the predicted path of the other transportation vehicle. The determination of the alternative trajectory of the transportation vehicle thus represents an optimization problem, which can be solved by the average person skilled in the art by a suitable programming task.

According to this disclosed embodiment of the transportation vehicle, the driving system is further set up for carrying out at least one automated driving maneuver for transferring the transportation vehicle to the alternative trajectory. In other words, the transportation vehicle independently changes its driving behavior to avoid the possible collision. The change consists of a lane change or of deceleration of the transportation vehicle, for example.

Also, the control device determines a driving instruction based on the alternative predicted trajectory and outputs it to the driving system. In this case, the driving system may be set up to perform at least one automated driving maneuver/ automated driving from the current to the alternative trajectory based on the received driving instruction. The control system designed for fully automatic guidance of the transportation vehicle and can control the longitudinal guidance as well as the transverse guidance of the transportation vehicle. Furthermore, the driving system may optionally access the at least one first sensor and/or the at least one second sensor for determining condition information and/or environment information of the transportation vehicle. These first and second sensors are therefore usable by the driving system and by the control unit.

Also, the output of a navigation message is carried out to indicate to the driver how he can change to the determined alternative trajectory. The output of the navigation message or the maneuver information, such as a lane change to the right, may be carried out together with the output of the warning message.

Another disclosed embodiment concerns a method of a control unit, wherein the control unit may be set up for capturing environment data of a transportation vehicle with at least one first sensor, for capturing condition data (vehicle data) of the transportation vehicle with at least one second sensor, for receiving information about another transportation vehicle and for communicating with a driving system and an output element of the transportation vehicle with a communication module of the transportation vehicle. This disclosed embodiment relates to a method of a control unit of a transportation vehicle, which has at least one such first sensor, at least one such second sensor, such a communication module, a driving system set up for automated driving of the transportation vehicle and the control unit.

The disclosed method of the control unit has the following: determining a predicted trajectory of the transportation vehicle based on vehicle data and environment data and/or map data, determining a predicted path of the transportation vehicles based on the predicted trajectory of the transportation vehicle and the vehicle geometry of the transportation vehicle, receiving a predicted trajectory and vehicle geometry data from another transportation vehicle by a data connection, determining a predicted path of the other transportation vehicle based on the predicted trajectory and vehicle geometry data of the other transportation vehicle, determining a possible collision of the transportation vehicle and the other transportation vehicle based on the predicted path of the transportation vehicle and the predicted path of the other transportation vehicle, and outputting a visible and/or audible warning by at least one output element and/or carrying out an automated driving maneuver by the driving system in the event of a determined possible collision.

Exemplary embodiments of the disclosed method correspond to the exemplary embodiments described above with reference to the disclosed transportation vehicle.

The disclosed method can be implemented by electric or electronic components (hardware), by firmware (ASIC) or by running a suitable program (software). Also, the disclosed method is realized or implemented by a combination of hardware, firmware and/or software. For example, individual components for performing individual method operations are designed as a separately integrated circuit or arranged on a common integrated circuit. Individual components set up for performing individual method operations may be further arranged on a flexible printed circuit carrier, a printed circuit carrier (PCB), a tape carrier package (TCP) or another suitable substrate.

The individual operations of the disclosed method are further designed as one or more processes, which run on one or more processors in one or more electronic computing devices and which are generated when executing one or more computer programs. The computing devices may be designed to work with other components, for example, a projector of the HUD and one or more sensors or cameras, to realize the functionalities described herein. The instructions of the computer programs may be stored in a memory, such as a RAM element. However, the computer programs can also be stored in a non-volatile storage medium, such as a CD-ROM, a flash memory, or the like.

It is also apparent to the person skilled in the art that the functionalities of multiple computers (data processing equipment) may be combined or combined in a single device, or that the functionality of a particular data processing device may be distributed to a variety of devices to perform the operations of the disclosed method without deviating from the disclosed method.

Another disclosed embodiment concerns a computer program, comprising commands which, when the program is executed by a computer such as a control unit of a transportation vehicle, cause it to carry out the disclosed method comprising determining a predicted trajectory of the transportation vehicle based on vehicle data and environment data and/or map data, determining a predicted path of the transportation vehicle based on the predicted trajectory of the transportation vehicle and the vehicle geometry data of the transportation vehicle, receiving a predicted trajectory and vehicle geometry data of another transportation vehicle by a data connection, determining a predicted path of the other transportation vehicles based on the predicted trajectory and the vehicle geometry data of the other transportation vehicle, determining a possible collision of the transportation vehicle and the other transportation vehicle based on the predicted path of the transportation vehicle and the predicted path of the other transportation vehicle, and outputting a visible and/or audible warning by at least one output element and/or carrying out an automated driving maneuver by the driving system in the event of a determined possible collision. Disclosed embodiments of the program correspond to the exemplary embodiments described above with reference to the disclosed transportation vehicle.

Another disclosed embodiment concerns a computer-readable storage medium, comprising commands which, when executed by a computer, such as a control unit of a transportation vehicle, cause it to carry out the disclosed method comprising determining a predicted trajectory of the transportation vehicle based on vehicle data and environment data and/or map data, determining a predicted path of the transportation vehicle based on the predicted trajectory of the transportation vehicle and vehicle geometry data of the transportation vehicle, receiving a predicted trajectory and vehicle geometry data of another transportation vehicle by a data connection, determining a predicted path of the other transportation vehicles based on the predicted trajectory and the vehicle geometry data of the other transportation vehicle, determining a possible collision of the transportation vehicle and the other transportation vehicle based on the predicted path of the transportation vehicle and the predicted path of the other transportation vehicle, and outputting a visible and/or audible warning by at least one output element and/or carrying out an automated driving maneuver by the driving system in the event of a determined possible collision. Disclosed embodiments of the storage medium correspond to the exemplary embodiments described above with reference to the disclosed transportation vehicle.

Unless stated otherwise in the individual case, the various disclosed embodiments referred to in this application can be combined with each other.

FIG. 1 shows a schematic representation, in particular, a block diagram, of an exemplary transportation vehicle 10, in particular, a two-track transportation vehicle with an internal combustion engine, an electric motor or a hybrid engine. The transportation vehicle 10 comprises a number of first sensors, in particular, a first sensor 11, a second sensor 12 and a third sensor 13.

The first sensors 11, 12, 13 are set up to capture environment data of the transportation vehicle 10 and include, for example, a camera for capturing an image of a road ahead of the transportation vehicle 10 and/or road boundaries, distance sensors, such as ultrasonic sensors, for detecting distances from objects surrounding the transportation vehicle 10, for example road boundaries such as walls or guardrails. The first sensors 11, 12, 13 transmit the environment signals they capture to a control unit 40 of the transportation vehicle 10.

The transportation vehicle 10 also has a plurality of second sensors, in particular, a fourth sensor 51, a fifth sensor 52, and a sixth sensor 53. The second sensors 51, 52, 53 are sensors for capturing data related to the transportation vehicle 10 itself, in particular, current position and movement information about the transportation vehicle 10. The second sensors are therefore velocity sensors, accelerometers, inclination sensors or the like, for example. The second sensors 51, 52, 53 transmit the state signals they have captured to the control unit 40 of the transportation vehicle 10. In addition, the second sensors 51, 52, 53 transmit their measurement results directly to the driving system 30 of the transportation vehicle 10.

The transportation vehicle further has a communication module 20 with a memory 21 and one or more transponders or transceivers 22. The transceiver 22 is a radio, Wi-Fi, GPS or BLUETOOTH® transceiver or the like, in particular, a transceiver set up for communication in a communication network. The transceiver communicates with the internal memory 21 of the communication module 20, for example, via a suitable data bus. By the transceiver 22, for example, the current position of the transportation vehicle 10 can be determined by communication with a GPS satellite 61 and can be stored in the internal memory 21. Moreover, the communication module 20 is set up to communicate by V2V communication with another transportation vehicle 62, optionally via a communication network. The communication module 20 also communicates with the control unit 40. It transmits data received by the control unit 40 and/or receives data to be sent from the control unit 40. Furthermore, the communication module 20 can also be set up for communication with a base station of a communication network.

The communication network may be a network according to the 3GPP standard, for example, an LTE, LTE-A (4G) or 5G communication network. The communication network may also be designed for the following operations or according to the following standards: High Speed Packet Access (HSPA), a Universal Mobile Telecommunication System (UMTS), UMTS Terrestrial Radio Access Network (UTRAN), evolved-UTRAN (e-UTRAN), Global System for Mobile communication (GSM), Enhanced Data rates for GSM Evolution (EDGE), GSM/EDGE Radio Access Network (GERAN). Alternatively or additionally, the communication network may also be designed according to one of the following standards: Worldwide Inter-operability for Microwave Access (WIMAX) network IEEE 802.16, Wireless Local Area Network (WLAN) IEEE 802.11. The communication network also may use one of the following coding methods: Orthogonal Frequency Division Multiple Access (OFDMA), Time Division Multiple Access (TDMA), Code Division Multiple Access (CDMA), a Wideband CDMA (WCDMA), Frequency Division Multiple Access (FDMA), or Spatial Division Multiple Access (SDMA), etc.

The transportation vehicle 10 also has a driving system 30, which is set up for fully automated driving of the transportation vehicle 10, in particular, for longitudinal and transverse guidance. The driving system 30 has a navigation module 32, which is set up to calculate routes between a starting point and a destination point and to determine the maneuvers to be performed by the transportation vehicle 10 along that route. Moreover, the driving system 30 comprises an internal memory 31, for example, for map materials, which communicates with the navigation module 32, for example, via a suitable data bus.

At least some of the second sensors 51, 52, 53 of the transportation vehicle transmit their measurement results directly to the driving system 30. Data transmitted thereby directly to the driving system 30 are the current position information and movement information of the transportation vehicle 10. These data may be captured by velocity sensors, accelerometers, inclination sensors, etc.

The exemplary transportation vehicle 10 further has a disclosed control unit 40, which is set up for carrying out the disclosed method, as explained in detail below. For this purpose, the control unit 40 has an internal memory 41 and a CPU 42, which communicate with each other, for example, via a suitable data bus. Moreover, the control unit 40 has a communication connection to at least the first sensors 11, 12, 13, the second sensors 51, 52, 53, the communication module 20 and the driving system 30, for example, via one or more respective CAN connections, one or more respective SPI connections or other suitable data connections.

Figure 2:
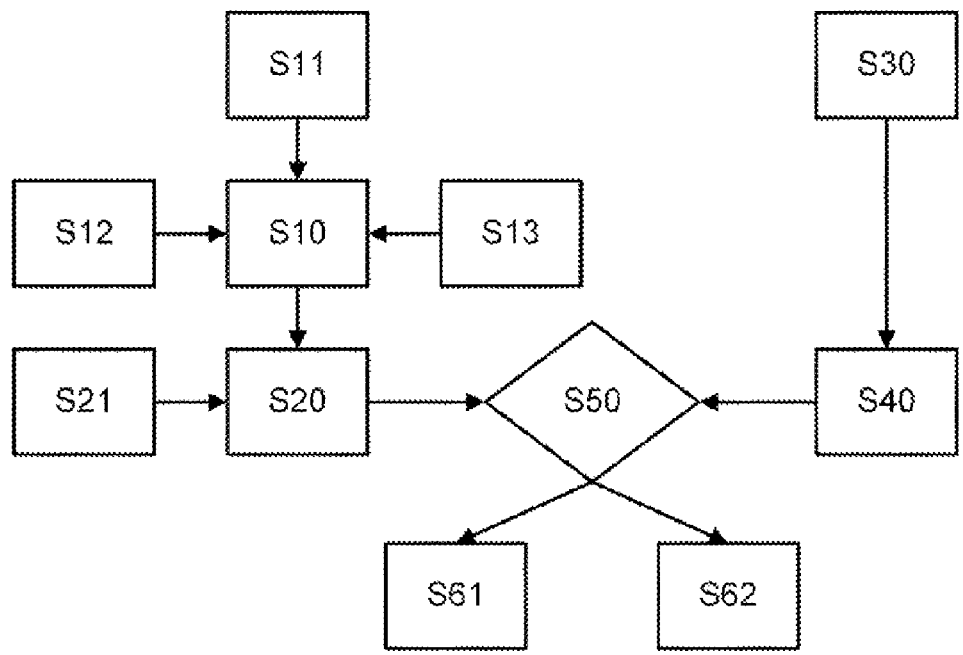
FIG. 2 shows a schematic flow diagram of a disclosed method.

FIG. 2 shows a schematic flow diagram of an exemplary method carried out by the disclosed transportation vehicle 10.

In an operation at S10 of the disclosed method, a predicted trajectory of the transportation vehicle 10 is determined by the control unit 40 of the transportation vehicle 10. For this purpose, the control unit receives various data, including in operation at S11 environment data from the first sensors 11, 12, 13, wherein the environment data have information about the current lane width and the type of lane boundary.

Furthermore, in operation at S12 the control unit 40 receives transportation vehicle data from the second sensors 51, 52, 53, wherein the transportation vehicle data have current position and motion information of the transportation vehicle 10. In addition, in operation at S13 the control unit 40 receives map information about a course of the road ahead as well as about a current navigation route, either from the internal memory 41 of the control unit 40 itself or from the navigation module 32 of the driving system 30.

The predicted trajectory is processed further in operation at S20, wherein the control unit 40 also uses vehicle geometry data received in operation at S21 for further processing of the predicted trajectory. The vehicle geometry data comprise information about the dimensions and swing-out behavior of the transportation vehicle 10. Taking into account the vehicle geometry data and the predicted trajectory, the control unit 40 finally determines the predicted path as the spatial areas occupied by the transportation vehicle 10 along the predicted trajectory.

In an operation at S30, the control unit receives 40 information about a predicted trajectory and vehicle geometry data of the other transportation vehicle 62 via the communication module 20. Based on the vehicle geometry data and the predicted trajectory of the other transportation vehicle 62, in operation at S40 the control unit 40 determines the predicted path of the other transportation vehicle 62 as the spatial areas occupied by the other transportation vehicle along the predicted trajectory of the other transportation vehicle 62.

In an operation at S50, the control unit 40 determines a possible collision of the transportation vehicle 10 with the other transportation vehicle 62 based on the path of the transportation vehicle 10 predicted in operation at S20 and based on the path of the other transportation vehicle 62 predicted in operation at S40. If no possible collision is determined in operation at S50, the disclosed method starts again, in particular, operations at S10 to S50 are repeated regularly to check regularly for possible collisions. Data from various transportation vehicles 62, in particular, from multiple other transportation vehicles 62, may be received at the same time.

If in operation at S50 it is determined that a collision of the transportation vehicles 10, 62 is possible or probable, in operation at S61 the output of a visible and/or audible warning to a driver of the transportation vehicle 10 is carried out by at least one output element 70. The at least one output element 70 may be part of a digital display and/or an infotainment system of the transportation vehicle 10. Alternatively or additionally, in operation at S62 performing an automated driving maneuver by the driving system 30 is carried out in response to the determination of a possible collision in operation at S50. The driving maneuver guides the transportation vehicle 10 to an alternative trajectory, on which a collision with the other transportation vehicle 62 is avoided.

REFERENCE CHARACTER LIST

10 transportation vehicle
11 first sensor
12 second sensor
13 third sensor
20 communication module
21 memory
22 transceiver
30 driving system
31 memory
32 navigation module
40 control unit
41 memory
42 CPU
51 fourth sensor
52 fifth sensor
53 sixth sensor
61 satellite
62 transportation vehicle
70 output element

The invention claimed is:

1. A transportation vehicle comprising:
at least one first sensor configured to capture environment data;
at least one second sensor to capture transportation vehicle data;
a communication module configured to establish a data connection with another transportation vehicle;
a driving system for the automated driving of the transportation vehicle;
at least one output element for a visible and/or audible warning signal; and
a control unit configured to:
determine a predicted trajectory of the transportation vehicle based on the transportation vehicle data and at least one of the environment data and map data;
determine a predicted path of the transportation vehicle based on the predicted trajectory of the transportation vehicle and based on dimensions of the transportation vehicle, on the number and positions of the axles of the transportation vehicle, and on distances of the corner points of the transportation vehicle from its axles as vehicle geometry data of the transportation vehicle;
receive a predicted trajectory and dimensions of the other transportation vehicle, the number and positions of the axles of the other transportation vehicle, and distances from the corner points of the other transportation vehicle to its axles as vehicle geometry data of the other transportation vehicle via the data connection;
determine a predicted path of the other transportation vehicles based on the predicted trajectory and the vehicle geometry data of the other transportation vehicle;
determine the environment data which includes a current lane width and information about a lane boundary of a currently traveled-on lane of the predicted path of the transportation vehicle;
determine the environment data which includes a current lane width and information about a lane boundary of a currently traveled-on lane of the predicted path of the other transportation vehicle;
determine a transportation vehicle protrusion indication indicative of whether the transportation vehicle will protrude beyond the lane boundary of the currently traveled-on lane of the predicted path based on the current lane width, the lane boundary, and the vehicle geometry of the transportation vehicle;
determine an other transportation vehicle protrusion indication indicative of whether the other transportation vehicle will protrude beyond the lane boundary of the currently traveled-on lane of the predicted path based on the current lane width, the lane boundary, and the vehicle geometry of the other transportation vehicle;
determine a possible collision between the transportation vehicle and the other transportation vehicle based on the predicted path of the transportation vehicle, the predicted path of the other transportation vehicle, the transportation vehicle protrusion indication, and the other transportation vehicle protrusion indication; and
control the at least one output element to output a warning signal and/or control the driving system to perform an automated driving maneuver in response to the determined possible collision.

2. The transportation vehicle of claim 1, wherein the control unit comprises an internal memory with map data stored on the internal memory and/or retrieves map data from a navigation system of the transportation vehicle.

3. The transportation vehicle of claim 1, wherein the control unit is further configured to determine the transportation vehicle data that include an absolute position, velocity, acceleration and direction of travel of the transportation vehicle by at least one second sensor and/or obtain the map data information about the course of the road and/or a navigation route of the transportation vehicle from an internal memory and/or a navigation system.

4. The transportation vehicle of claim 1, further comprising a trailer, wherein the control unit is configured to determine as vehicle geometry data dimensions of the trailer, number and position of the axles of the trailer, the distances from corner points of the trailer to the trailer axles, and at least one pivot point of a trailer coupling and/or receives similar vehicle geometry data from the other transportation vehicle.

5. The transportation vehicle of claim 1, wherein the control unit determines the spatial areas entered by the transportation vehicle and the other transportation vehicle in the future as the respective predicted paths and, in response to the predicted paths overlapping, determines a possible collision.

6. The transportation vehicle of claim 1, wherein the control unit determines at least one swing-out area of the transportation vehicle or the other transportation vehicle based on the vehicle geometry data and the predicted trajectory of the transportation vehicle or the other transportation vehicle and determines the predicted path of the transportation vehicle and the predicted path of the other transportation vehicle based on the at least one swing-out area.

7. The transportation vehicle of claim 1, wherein the control unit is configured to determine, in response to the determination of the possible collision with the other transportation vehicle, an alternative trajectory of the transportation vehicle, which, in combination with the vehicle geometry data of the transportation vehicle, results in an alternative predicted path of the transportation vehicle which does not overlap the predicted path of the other transportation vehicle.

8. The transportation vehicle of claim 7, wherein the driving system carries out at least one automated maneuver to transfer the transportation vehicle to the alternative trajectory and/or wherein the output element outputs a navigation instruction to a driver of the transportation vehicle for the transfer of the transportation vehicle to the alternative trajectory.

9. A method of a control unit of a transportation vehicle, the method comprising:
    determining a predicted trajectory of the transportation vehicle based on transportation vehicle data and environment data and/or map data;
    determining a predicted path of the transportation vehicle based on the predicted trajectory of the transportation vehicle, and based on dimensions of the transportation vehicle, on the number and positions of the axles of the transportation vehicle, and on the distances from the corner points of the transportation vehicle to its axles as vehicle geometry data of the transportation vehicle;
    receiving a predicted trajectory as vehicle geometry data of another transportation vehicle dimensions of the other transportation vehicle, the number and positions of the axles of the other transportation vehicle and the distances from the corner points of the other transportation vehicle to its axles by a data connection;
    determining a predicted path of the other transportation vehicles based on the predicted trajectory and vehicle geometry data of the other transportation vehicle;
    determine the environment data which includes a current lane width and information about a lane boundary of a currently traveled-on lane of the predicted path of the transportation vehicle;
    determine the environment data which includes a current lane width and information about a lane boundary of a currently traveled-on lane of the predicted path of the other transportation vehicle;
    determine a transportation vehicle protrusion indication indicative of whether the transportation vehicle will protrude beyond the lane boundary of the currently traveled-on lane of the predicted path based on the current lane width, the lane boundary, and the vehicle geometry of the transportation vehicle; and
    determine an other transportation vehicle protrusion indication indicative of whether the other transportation vehicle will protrude beyond the lane boundary of the currently traveled-on lane of the predicted path based on the current lane width, the lane boundary, and the vehicle geometry of the other transportation vehicle
    determining a possible collision between the transportation vehicle and the other transportation vehicle based on the predicted path of the transportation vehicle, the predicted path of the other transportation vehicle, the transportation vehicle protrusion indication, and the other transportation vehicle protrusion indication;
    outputting a visible and/or audible warning by at least one output element and/or performing an automated driving maneuver by the driving system in the case of the determination of a possible collision.

10. The method of claim 9, wherein the control unit includes an internal memory with map data stored on the internal memory and/or retrieves map data from a navigation system of the transportation vehicle.

11. The method of claim 9, further comprising:
    determining the transportation vehicle data which includes an absolute position, velocity, acceleration and direction of travel of the transportation vehicle by at least one second sensor; and/or
    obtaining the map data information about the course of the road and/or a navigation route of the transportation vehicle from an internal memory and/or a navigation system.

12. The method of claim 9, further comprising determining vehicle geometry data dimensions of a trailer including number and position of the axles of the trailer, the distances from corner points of the trailer to the trailer axles, and at least one pivot point of a trailer coupling and/or receives similar vehicle geometry data from the other transportation vehicle.

13. The method of claim 9, further comprising determining the spatial areas entered by the transportation vehicle and the other transportation vehicle in the future as the respective predicted paths and, in response to the predicted paths overlapping, determines a possible collision.

14. The method of claim 9, further comprising determining at least one swing-out area of the transportation vehicle or the other transportation vehicle based on the vehicle geometry data and the predicted trajectory of the transportation vehicle or the other transportation vehicle and determines the predicted path of the transportation vehicle and the predicted path of the other transportation vehicle based on the at least one swing-out area.

15. The method of claim 9, further comprising determining, in response to the determination of the possible collision with the other transportation vehicle, an alternative trajectory of the transportation vehicle, which, in combination with the vehicle geometry data of the transportation vehicle, results in an alternative predicted path of the transportation vehicle which does not overlap the predicted path of the other transportation vehicle.

16. The method of claim 15, wherein the driving system carries out at least one automated maneuver to transfer the transportation vehicle to the alternative trajectory and/or wherein the output element outputs a navigation instruction to a driver of the transportation vehicle for the transfer of the transportation vehicle to the alternative trajectory.

* * * * *